Figure 1:
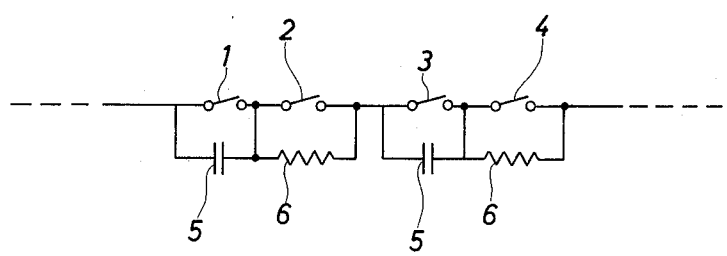

Jan. 4, 1966  H. WUTZ  3,227,924
HIGH VOLTAGE POWER CIRCUIT BREAKER POLE
UNITS HAVING SERIES BREAKS
Filed Oct. 23, 1961  3 Sheets-Sheet 1

INVENTOR:
Herbert Wutz

INVENTOR:
Herbert Wutz

United States Patent Office 3,227,924
Patented Jan. 4, 1966

3,227,924
HIGH VOLTAGE POWER CIRCUIT BREAKER POLE UNITS HAVING SERIES BREAKS
Herbert Wutz, Frankfurt am Main, Germany, assignor to Continental Elektroindustrie Aktiengesellschaft Voigt & Haeffner, Frankfurt am Main, Germany
Filed Oct. 23, 1961, Ser. No. 146,876
Claims priority, application Germany, Oct. 26, 1960, C 22,623
20 Claims. (Cl. 317—11)

This invention refers to pole units for high-voltage power circuit breakers, and more particularly to such pole units which include a plurality of serially connected interrupting devices adapted to form a plurality of serially connected breaks.

It is one object of this invention to provide improved pole units of this description.

Pole units of the kind under consideration are disclosed in United States Patent 2,964,605 to Richard Schulz, December 13, 1960 Fluid Pressure Operated Circuit Breaker Pole Units and in the copending patent application of said Richard Schulz, filed November 24, 1959, Ser. No. 855,132, now U.S. Patent 3,072,767 for Air Blast Circuit Breakers.

It is another object of the invention to provide improved versions of the structures disclosed in the aforementioned patent and in the aforementioned patent application.

There is a need in circuit breaker pole units designed for very high circuit voltages and, therefore, requiring a plurality of serially connected interrupting devices of which each comprises a pair of cooperating separable contacts for drawing an arc therebetween upon separation thereof, which pole units include means to properly distribute the total transient recovery voltage appearing across said plurality of interrupting devices. This is generally achieved by shunt elements as, for instance, capacitors or resistors, arranged across each of the individual interrupting devices which are connected in series.

It is another object of this invention to provide improved high-voltage circuit breakers having such potential distribution shunt means.

Another object of the invention is to provide high-voltage circuit breaker pole units adapted to operate effectively in instances where the transient recovery voltage rises initially at a rapid rate and reaches ultimately high values.

Considering a high-voltage circuit breaker pole unit interrupting a short-circuited phase, the short-circuit occurring several miles from the point where the circuit breaker pole unit is located so that there are several miles of line between the point where the short-circuit occurred and the location of the pole unit; the low frequency recovery voltage rises upon the first current zero after arc extinction and reaches a stationary value. As mentioned, the frequency of the recovery voltage is low. A travelling wave occurs in the portion of the line which is being disconnected by the operation of the circuit breaker pole unit. This results in a high frequency discharge. Consequently the circuit breaker pole unit is subjected to a transient recovery voltage initially rising at a very rapid rate. The first peak resulting from the rapid rise of the transient recovery voltage has, however, a relatively moderate value.

It is, therefore, another object of this invention to provide circuit breaker pole units adapted to effectively cope with situations of the aforementioned character.

To this end the pole units must be capable of rapidly recovering their dielectric strength immediately upon arc extinction, or current zero. The dielectric strength reached at a relatively rapid rate may be relatively small. The dielectric strength required for withstanding the peak value of the transient recovery voltage need not to be reached at such a rapid rate as the rise of the dielectric strength initially required. Cross-air blast circuit breakers and oil circuit breakers, particularly low oil content or oil poor circuit breakers, have a tendency to recover their dielectric strength relatively rapidly; yet circuit breakers of this description cannot readily be designed for relatively high circuit voltages, i.e. the cost of circuit breakers of this description, if designed for relatively high circuit voltages, tend to be excessive. The gaps formed in axial air-blast circuit breakers tend to reach ultimately relatively high dielectric strengths, yet the recovery of the dielectric strength of such circuit breakers occurs at a relatively slow rate.

Figure 2:
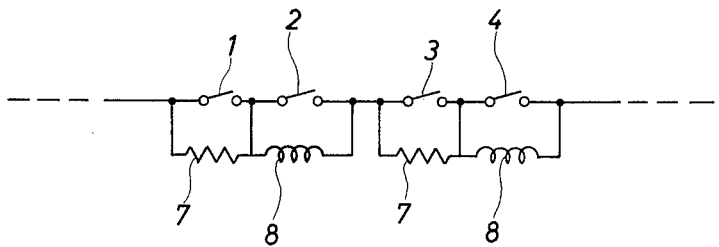
Figure 3:
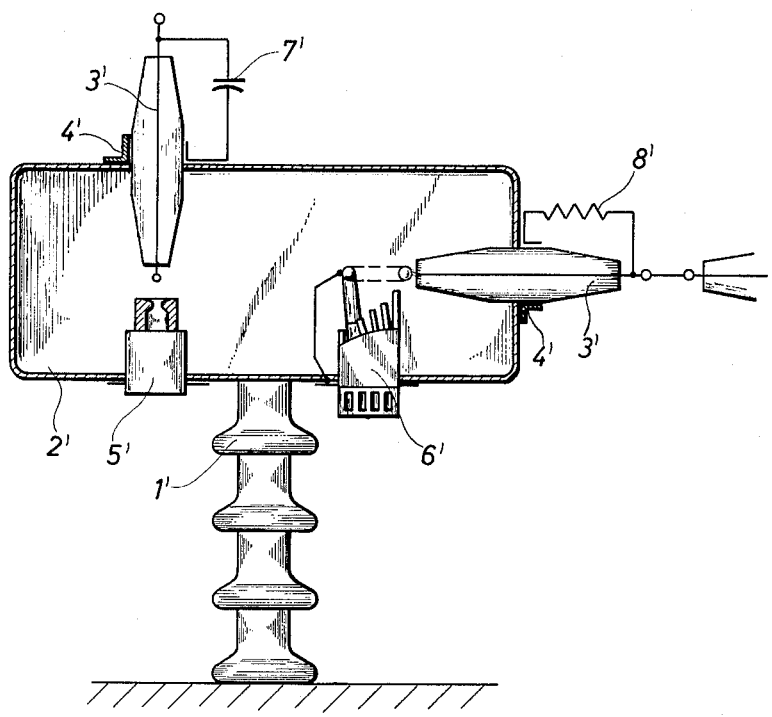
Figure 4:
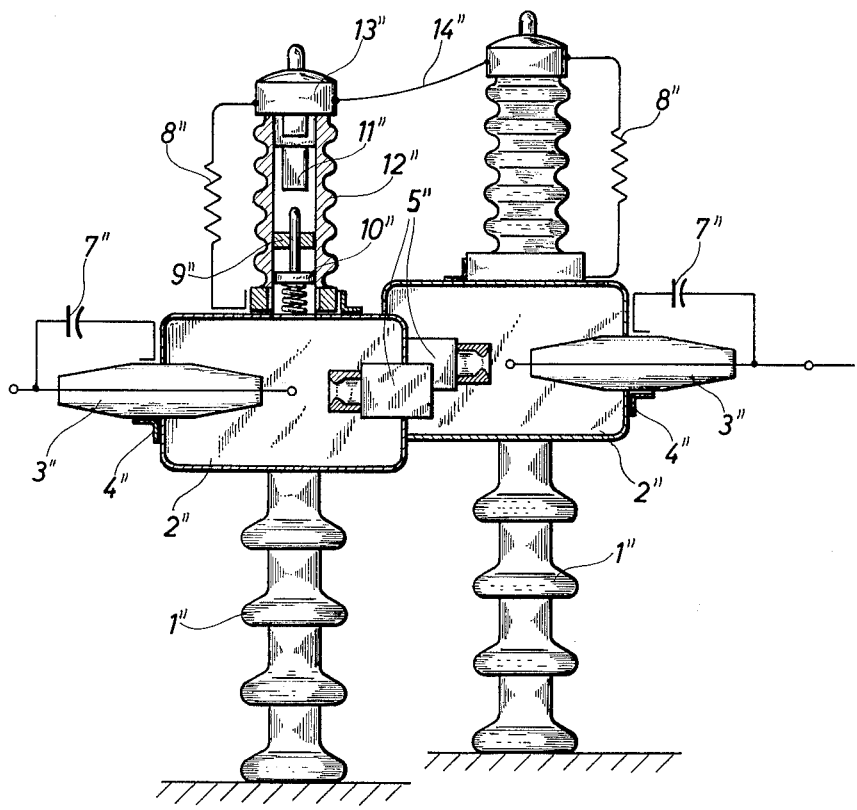

For the foregoing reasons this invention contemplates to combine in one pole unit interrupting devices of two different kinds, namely interrupting devices forming upon separation of their cooperating contacts a gap having a relatively rapid rate of dielectric recovery and a relatively small, or limited, ultimate dielectric strength, and interrupting devices forming upon separation of their cooperating contacts a gap having a relatively slow rate of dielectric recovery and a relatively high ultimate dielectric strength The novel features that are considered characteristic of the invention are set forth with particularity in the appended claims. The invention itself, both as to structure and mode of operation, as well as additional objects and advantages thereof, will best be understood from the following description when read in connection with the acompanying drawings, in which FIG. 1 is a diagrammatic representation of a circuit breaker pole unit embodying the present invention;

FIG. 2 is a diagrammatic representation of another circuit breaker pole unit embodying the present invention;

FIG. 3 is a diagrammatic representation of a circuit breaker pole unit comprising an interrupting device of the axial air-blast type and an interrupting device of the cross air-blast type; and FIG. 4 is a diagrammatic representation of a circuit breaker pole unit including an axial air-blast type interrupting device and a low oil content interrupting device wherein oil is used as the arc-quenching medium.

Referring now to the drawings, and more particularly to FIGS. 1 and 2 thereof, reference numerals 1, 2, 3 and 4 have been applied to indicate four interrupting devices associated with means for serially connecting four interrupting devices into one phase of an electric high-voltage polyphase circuit. Each of the four interrupting devices 1, 2, 3 and 4 includes a pair of cooperating separable contacts, namely a fixed contact and a movable contact. Upon separation of the cooperating pairs of contacts in the four interrupting devices 1, 2, 3 and 4 four serially related arcs are established therein. The interrupting devices 1 and 3, on the one hand, and the interrupting devices 2 and 4, on the other hand, are of the same type, or identical; but the interrupting devices 1 and 2 differ from one another and the interrupting devices 3 and 4 differ from one another. The interrupting devices 1 and 3 are adapted to have a relatively slow dielectric recovery, but the ultimate dielectric strength of the gaps formed between their separated contacts is relatively high. The interrupting devices 2 and 4 are adapted to form gaps between their separated cooperating contacts whose dielectric recovery is relatively rapid, though the ultimate dielectric strength of the gaps or breaks in interrupting devices 2 and 4 is relatively small.

As shown in FIG. 1 the interrupting devices 1, 3 are shunted by capacitors 5 and the interrupting devices 2, 4 are shunted by resistors 6. According to FIG. 2 the interrupting defices 1, 3 are shunted by resistors 7 and the interrupting devices 2, 4 are shunted by inductances 8. The shunt elements 5, 6, 7 and 8 are provided to control the voltage distribution across the constituent interrupting devices 1, 2, 3, 4 of each pole unit. If it is intended to jointly use capacitors and resistors for the purpose of voltage distribution control, the interrupting devices whose rate of dielectric recovery is relatively fast should be shunted by resistors and the interrupting devices whose ultimate dielectric strength is relatively high should be shunted by capacitors. On the other hand, if it is desired to use resistors and inductances for the purpose of voltage distribution control, then the interrupting devices 2, 4 whose rate of dielectric recovery is relatively fast should be shunted by inductances and the interrupting devices 1, 3 whose ultimate dielectric strength is relatively high should be shunted by resistors.

It will be understood that the number of pairs of dissimilar interrupting devices which must be connected in series in any given application depends largely upon the circuit voltage. If the circuit voltage is relatively small, it may suffice to serially connect but two interrupting devices of which one device has a relatively rapid rate of dielectric recovery but a relatively limited ultimate dielectric strength, whereas the other device has a relatively slow rate of dielectric recovery but a relatively high ultimate dielectric strength. Pairs of dissimilar interrupting devices of the aforementioned description may briefly be referred to as complementary pairs of interrupting devices. Where the circuit voltage and the transient recovery voltage are particularly high, it may be necessary, or desirable, to serially connect a larger number of interrupting devices, as shown in FIGS. 1 and 2.

A performance characteristic of axial air-blast circuit breakers is the relatively high dielectric strength which they ultimately recover, though such circuit breakers have a relatively limited rate of dielectric recovery. Therefore axial air blast circuit breakers are particularly well suited to take the place of the interrupters 1 and 3 of FIGS. 1 and 2. A characteristic feature of oil circuit breakers, particularly oil poor circuit breakers and also of cross air-blast circuit breakers is their relatively rapid rate of dielectric recovery and their relatively small, or limited, ultimate dielectric strength. For this reason the aforementioned types or kinds of circuit breakers are particularly well suited to take the place of the interrupting devices 2 and 4 in FIGS. 1 and 2.

It is desirable in the arrangement of FIG. 1 to so dimension the shunt capacitors 5 and shunt resistors 6 that the time constant $R \times C$ of the circuit is less than $1 \times 10^{-3}$ sec.

In the arrangement of FIG. 2 it is desirable to so dimension the shunt resistors 7 and the shunt inductances 8 that the time constant $L/R$ of the circuit is less than $10^{-3}$ sec. As a general rule, it is desirable to so integrate pairs of complementary interrupting devices that they form a structural unit. This will be more apparent from the following consideration of FIGS. 3 and 4.

It may also be desirable to provide the interrupting devices whose dielectric recovery is relatively rapid but which have a relatively limited ultimate dielectric strength with automatic means for reclosing their pairs of separated contacts upon arc extinction and interruption of the faulted circuit. Such reclosing devices are well known in the art and do not call for a detailed description. Provision of such reclosing means in the structures of FIGS. 1 and 2 would result in reclosing of the circuit interrupters 2 and 4 upon clearing of the fault, leaving it to the interrupters 1 and 3 to provide the dielectric strength needed for interposing the additional required amount of circuit insulation.

Considering a linearly rising transient recovery voltage $u_w$ having a rate of rise S and rising during an interval of time $t$, then the voltage at the end of said interval will be $$u_w = Sxt$$

In the arrangement of FIG. 1 the rise after current zero of the voltage across the gap in interrupters 1 and 3 will be less than the aforementioned rise of the transient recovery voltage.

It can be shown that the transient recovery voltage across interrupter 1 rises in accordance with the following equation $$u_{w1} = S(t - R \cdot C[1 - e^{-t/RC}])$$

wherein $u_{w1}$ = portion of transient recovery voltage across interrupter 1;
$S$ = rate of rise of the transient recovery voltage;
$t$ = time;
$R$ = resistance value of resistor 6;
$C$ = capacitance of the capacitor or condenser 5 and,
$e$ = the base of the natural logarithm It is apparent from the above equation that the rate of rise of the recovery voltage across interrupter 1 immediately upon arc extinction is relatively slow. This is very desirable. If the duration of time is known during which the transient recovery voltage may be assumed to rise linearly, then by selection of the resistance of R of resistor 6 and of the capacitance C of capacitor 5, the maximal dielectric stress may be determined to which the gap formed between the separated contacts in device 1 will be subjected by the transient recovery voltage. This also determines the dielectric stress to which the gap formed in the complementary interrupter 2 will be subjected. This dielectric stress is equal to the transient recovery voltage minus the voltage appearing across the gap formed across the separated contacts in interrupter 1.

Referring now to FIG. 3, numeral 1' has been applied to indicate a supporting insulator supporting a tank 2'. Bushings 3' supported by flanges 4' are arranged on both ends of tank 2' filled with air under pressure. The axially inner end of the stud inserted into the left bushing 3' forms a stationary contact for an axial air-blast circuit breaker, and the axially inner end of the stud inserted into the right bushing 3' forms a stationary contact for a cross-air-blast circuit breaker generally indicated by reference character 6'. Numeral 5' indicates generally the constituent parts of an axial air-blast circuit breaker having a movable contact (not shown) adapted to engage the axially inner end of the left bushing 3' and to be separated therefrom. The cooperating separable contacts of the axial air-blast circuit breaker are shunted by a capacitor 7' and the cooperating separable contacts of the cross-air-blast circuit breaker 6' are shunted by a resistor 8'. Where the circuit voltage is particularly high several pole units of the kind shown in FIGS. 3 may be connected in series in one phase of an electric polyphase circuit.

Referring now to FIG. 4, numerals 1" have been applied to indicate a pair of supporting insulators each supporting a tank 2" filled with air under pressure. The left side of left tank 2" and the right side of right tank 2" each support a bushing 3" by means of a flange 4". Reference numeral 5" has been applied to indicate the constituent parts of a pair of axial air-blast circuit breakers each including a movable contact adapted to cooperate with a fixed contact formed by the axially inner end of one of the studs forming part of bushings 3". Thus the structure of FIG. 4 includes a pair of circuit breakers whose dielectric recovery is relatively slow but whose ultimate dielectric strengh is relatively high. The cooperating contacts of each axial air-blast circuit breaker are shunted by one of two capacitors 7". Each of tanks 2" supports a complete oil poor or low oil content circuit breaker of which each is housed in a hollow insulating column 12" which may be made of a suitable ceramic material. These oil poor or low oil content circuit breakers which are identical and of which one is shown in section and the other in elevation in FIG. 4 have a relatively rapid dielectric recovery, yet their ultimate dielectric strength is relatively limited. Each oil poor circuit breaker comprises a rod-type or bayonet contact 9″ adapted to be operated by a piston 10″ and forming an integral part thereof. Pistons 10″ are under the bias of helical springs tending to move contacts 9″ and piston 10″ to their open contact position, i.e. to the position shown in FIG. 4. Numeral 11″ has been applied to indicate an arc-quenching chamber housing a fixed contact (not shown) adapted to cooperate with movable rod contact 9″ to draw an arc between said contacts upon separation thereof. The top ends of insulating columns 12″ are closed by metal caps 13″. The metal cap 13″ on the left oil poor circuit breaker is conductively connected to the metal cap 13″ of the right oil poor circuit breaker by a flexible conductor 14′, e.g. stranded wires. The cooperating contacts of each oil poor circuit breaker are shunted by one of a pair of resistors 8″.

The current path through the device of FIG. 4 is as follows: Stud in the left bushing 3″, movable contact in left axial air-blast circuit breaker 5″, left tank 2″, movable contact 9″ in left oil poor circuit breaker, fixed contact in left oil poor circuit breaker, cap 13″ of left oil poor circuit breaker, flexible conductor 14″, cap 13″ of right oil poor circuit breaker, fixed contact of right oil poor circuit breaker, movable contact of right oil poor circuit breaker, right tank 2″, movable contact of right axial air-blast circuit breaker 5″, stud in right bushing 3″.

The axial air-blast circuit breaker structure shown but diagrammatically in FIG. 4 may be of the same general character as that disclosed in the above referred-to copending patent application Ser. No. 855,132, now U.S. Patent 3,072,767 and reference may be had to that patent for further details in regard to the design and construction of this type of air-blast circuit breakers.

Oil poor or low oil content oil circuit breakers which may be used in the structure of FIG. 4 are well known in the art and described in many printed publications. Reference may be had in regard to such circuit breakers, for instance, to the CIGRE publication 1946, No. 121, E. Vogelsanger "Researches on arc quenching in low-oil-content circuit breakers." A brief summary of special arc control devices applicable to low-oil-content or oil poor circuit breakers is given on pages 124 and 125 of the textbook by A. Arnold, Switchgear Practice, London, England 1942.

It is apparent from the foregoing that there has been described and shown a novel, useful, composite structure for achieving a novel kind of performance characteristic of circuit breaker pole units which structure satisfies initial high recovery rate requirements and ultimate high dielectric strength requirements.

It will further be apparent from the foregoing that there has been described and shown a composite pole unit whose constituent circuit breaker units 1, 3 having a relatively slow dielectric recovery rate are shunted by circuit elements whose impedance to the passage of high frequency currents is relatively low, and whose constituent circuit breaker units 2, 4 having a relatively high dielectric recovery rate are shunted by circuit elements whose impedance to the passage of high frequency currents is relatively large. Hence, as far as high frequency currents are concerned, the voltage drop across the former circuit breaker units 1, 3 will be small in comparison to the voltage drop across the latter circuit breaker units 2, 4. Therefore the preponderant portion of the transient recovery voltage due to a high frequency discharge immediately following arc-extinction will appear across the circuit breaker pole units 2, 4 inherently suited by virtue of their relatively high dielectric recovery rate to withstand the first cycle or first few cycles of the high frequency component of the transient recovery voltage. There is, therefore, a coordination between the impedances of the shunting circuit elements and the performance characteristics of the shunted interrupter units or circuit breaker units.

I claim as my invention:

1. A pole unit for a high-voltage circuit breaker comprising:
   (a) a pair of circuit interrupting devices each including cooperating separable contact means forming a gap therebetween upon separation thereof;
   (b) means for serially connecting said pair of interrupting devices into a phase of an electric high-voltage circuit;
   (c) means shunted across each of said pair of interrupting devices for controlling the voltage distribution across said pair of interrupting devices;
   (d) each of said pair of interrupting devices being structurally different from the other; and
   (e) one of said pair of interrupting devices being adapted to form a gap upon separation of said separable contact means having a relatively rapid initial rate of dielectric recovery and a relatively small ultimate dielectric strength; and
   (f) the other of said pair of interrupting devices being adapted to form a gap upon separation of said separable contact means having a relatively slow initial rate of dielectric recovery and a relatively high ultimate dielectric strength.

2. A pole unit as specified in claim 1 wherein said pair of interrupting devices are integrated to form a structural unit.

3. A pole unit as specified in claim 1 wherein said one of said pair of interrupting devices is provided with automatic means for reclosing said contact means thereof upon interruption of said phase of an electric high-voltage circuit.

4. A pole unit for high-voltage circuit breakers comprising:
   (a) a plurality of pairs of circuit interrupting devices having separable contacts;
   (b) means for serially connecting said plurality of pairs of interrupting devices into an electric circuit;
   (c) each of said plurality of pairs of interrupting devices including a first interrupting device having a relatively rapid initial rate of dielectric recovery and a relatively limited ultimate dielectric strength;
   (d) each of said plurality of pairs of interrupting devices including a second interrupting device having a relatively low initially rate of dielectric recovery a relatively high ultimate dielectric strength;
   (e) a plurality of pairs of dissimilar circuit elements, each of said plurality of pairs of dissimilar circuit elements shunting one of said plurality of pairs of circuit interrupting devices;
   (f) each of said plurality of pairs of dissimilar circuit elements including a first kind of circuit elements shunting said first interrupting device in each of said plurality of pairs of interrupting devices; and
   (g) each of said plurality of pairs of dissimilar circuit elements including a second kind of circuit elements shunting said second interrupting device in each of said plurality of pairs of interrupting devices.

5. A pole unit as specified in claim 4 wherein:
   (a) a resistor is shunting said first interrupting device in each of said plurality of pairs of interrupting devices; and
   (b) a capacitor is shunting said second interrupting device in each of said plurality of pairs of interrupting devices.

6. A pole unit as specified in claim 4 wherein:
   (a) an inductance is shunting said first interrupting device in each of said plurality of pairs of interrupting devices; and (b) a resistor is shunting said second interrupting device in each of said plurality of pairs of interrupting devices.

7. A pole unit for a high-voltage circuit breaker comprising:
(a) a pair of circuit interrupting devices each including co-operating separable contact means forming a gap therebetween upon separation thereof;
(b) means for serially connecting said pair of interrupting devices into a phase of an electric high-voltage circuit;
(c) one of said pair of interrupting devices being adapted to form upon separation of said separable contact means a gap having a relatively rapid initial rate of dielectric recovery and a relatively small ultimate dielectric strength;
(d) the other of said pair of interrupting devices being adapted to form upon separation of said separable contact means a gap having a relatively slow initial rate of dielectric recovery and a relatively high ultimate dielectric strength;
(e) a resistor shunting said one of said pair of interrupting devices; and
(f) a capacitor shunting the other of said pair of interrupting devices.

8. A pole unit as specified in claim 7 wherein the time constant resulting from the presence of said resistor and the presence of said capacitor is less than $10^{-3}$ sec.

9. A pole unit for a high-voltage circuit breaker comprising:
(a) a pair of circuit interrupting devices each including co-operating separable contact means forming a gap therebetween upon separation thereof;
(b) means for serially connecting said pair of interrupting devices into a phase of an electric high-voltage circuit;
(c) one of said pair of interrupting devices being adapted to form upon separation of said separable contact means a gap having a relatively rapid initial rate of dielectric recovery and a relatively small ultimate dielectric strength;
(d) the other of said pair of interrupting devices being adapted to form upon separation of said separable contact means a gap having a slow initial rate of dielectric recovery and a relatively high ultimate dielectric strength;
(e) an inductance shunting said one of said pair of interrupting devices; and
(f) a resistor shunting said other of said pair of interrupting devices.

10. A pole unit as specified in claim 9 wherein the time constant resulting from the presence of said inductance and the presence of said resistor is less than $10^{-3}$ sec.

11. A pole unit for a high-voltage circuit breaker comprising:
(a) a pair of circuit interrupting devices each including co-operating separable contact means forming a gap therebetween upon separation thereof;
(b) means for serially connecting said pair of interrupting devices into a phase of an electric high-voltage circuit;
(c) means shunted across said pair of interrupting devices for controlling voltage distribution across said pair of interrupting devices;
(d) arc-quenching means in one of said pair of interrupting devices including a first arc-quenching medium, said one of said pair of interrupting devices being adapted to form upon separation of said separable contact means a gap having a relatively rapid initial rate of dielectric recovery and a relatively small ultimate dielectric strength; and
(e) arc-quenching means in the other of said pair of interrupting devices including a second arc-quenching medium different from said first arc-quenching medium, said other of said pair of interrupting devices being adapted to form upon separation of said separable contact means a gap having a relatively slow initial rate of dielectric recovery and a relatively high ultimate dielectric strength.

12. A pole unit as specified in claim 11 wherein:
(a) said first arc-quenching medium is oil;
(b) said second arc-quenching medium is air under pressure; and
(c) said other of said pair of interrupting devices is an axial air-blast circuit breaker.

13. A pole unit for a high-voltage circuit breaker comprising:
(a) a cross air-blast circuit breaker including cooperating separable contact means forming a gap therebetween upon separation thereof;
(b) an axial air-blast circuit breaker including co-operating separable contact means forming a gap therebetween upon separation thereof;
(c) means for serially connecting said cross air-blast circuit breaker and said axial air-blast circuit breaker into a phase of an electric high-voltage circuit; and
(d) separate voltage distribution control means shunted across said cross air-blast circuit breaker and shunted across said axial air-blast circuit breaker.

14. A pole unit for high-voltage circuit breakers comprising:
(a) a pair of circuit interrupting devices each including cooperating separable contact means forming a gap therebetween upon separation thereof;
(b) means for serially connecting said pair of interrupting devices into an electric circuit;
(c) one of said pair of interrupting devices having initially a relatively rapid dielectric recovery rate and initially a relatively limited ultimate dielectric strength;
(d) the other of said pair of interrupting devices having a relatively slow dielectric recovery rate and a relatively large ultimate dielectric strength;
(e) a first circuit element having a relatively high impedance to the passage of currents having a relatively high frequency shunted across said one of said pair of interrupting devices; and
(f) a second circuit element having a relatively low impedance to the passage of currents having a relatively high frequency shunted across said other of said pair of interrupting devices.

15. A pole unit for a high-voltage circuit breaker comprising in combination:
(a) a cross-air-blast circuit breaker having a pair of cooperative separable contacts;
(b) an axial air-blast circuit breaker having a pair of cooperative separable contacts;
(c) means for serially connecting said cross air-blast circuit breaker and said axial air-blast circuit breaker into an electric high-voltage circuit;
(d) an impedance shunting said pair of contacts of said cross-air-blast circuit breaker; and
(e) a capacitor shunting said pair of contacts of said axial air-blast circuit breaker.

16. A pole unit for high-voltage circuit breakers comprising in combination:
(a) an oil circuit breaker including a pair of cooperative separable contacts and having a relatively rapid initial dielectric recovery rate and a relatively limited ultimate dielectric strength;
(b) an air-blast circuit breaker including a pair of cooperative separable contacts and having a relatively slow initial dielectric recovery rate and a relatively high ultimate dielectric strength;
(c) means for serially connecting said oil circuit breaker and said air-blast circuit breaker into an electric high-voltage circuit;
(d) an impedance shunting said pair of contacts of said oil circuit breaker; and (e) a capacitor shunting said pair of contacts of said air-blast circuit breaker.

17. A pole unit for high-voltage circuit breakers comprising in combination:
   (a) an oil circuit breaker of the low oil content type including a pair of cooperative separable contacts and having a relatively rapid initial dielectric recovery rate and a relatively limited ultimate dielectric strength;
   (b) an axial air-blast circuit breaker including a pair of cooperative separable contacts and having a relatively slow initial dielectric recovery rate and a relatively high ultimate dielectric strength;
   (c) means for serially connecting said oil circuit breaker and said axial air-blast circuit breaker into an electric high-voltage circuit; and
   (d) means for apportioning the total voltage across both said oil circuit breaker and said axial air-blast circuit breaker, said voltage apportioning means including a first shunt extending across the said pair of contacts of said oil circuit breaker and a second shunt extending across said pair of contacts of said axial air blast circuit breaker.

18. A pole unit for high-voltage circuit breakers comprising in combination:
   (a) a cross-air-blast circuit breaker having a pair of cooperative separable contacts;
   (b) an axial air-blast circuit breaker having a pair of cooperative separable contacts;
   (c) means for serially connecting said cross-air-blast circuit breaker and said axial air-blast circuit breaker into an electric high-voltage circuit; and
   (d) means for apportioning the total voltage across both said cross-air-blast circuit breaker and said axial air-blast circuit breaker, said last mentioned means including a first shunt extending across said pair of contacts of said cross-air-blast circuit breaker and a second shunt extending across said pair of contacts of said axial air-blast circuit breaker.

19. A pole unit for high-voltage circuit breakers as specified in claim 18 comprising a common insulating column supporting both said cross-air-blast circuit breaker and said axial air-blast circuit breaker.

20. A pole unit for high-voltage circuit breakers comprising in combination:
   (a) an axial air-blast circuit breaker including a tank for air under pressure, a pair of cooperating separable contacts arranged inside said tank and a column supporting said tank;
   (b) an oil circuit breaker of the low oil content type including a pair of coopertive separable contacts, said oil circuit breaker being mounted on said tank of said axial air blast circuit breaker;
   (c) means for serially connecting said axial air-blast circuit breaker and said oil circuit breaker into an electric high-voltage circuit;
   (d) a capacitor shunted across said pair of contacts of said axial air-blast circuit breaker; and
   (e) an impedance shunted across said pair of contacts of said oil circuit breaker.

References Cited by the Examiner

UNITED STATES PATENTS

| | | | |
|---|---|---|---|
| 2,292,252 | 8/1942 | Thormen | 317—11.3 |
| 2,336,316 | 12/1943 | Thornmen | 200—145 |
| 2,340,827 | 2/1944 | Thornmen | 200—145 |
| 2,921,168 | 1/1960 | Jorwald | 200—145 |

FOREIGN PATENTS

| | | |
|---|---|---|
| 1,026,826 | 3/1958 | Germany. |
| 1,064,134 | 8/1959 | Germany. |
| 1,132,213 | 6/1962 | Germany. |
| 562,729 | 7/1944 | Great Britain. |

SAMUEL BERNSTEIN, *Primary Examiner.*